(12) United States Patent
Mchatet

(10) Patent No.: US 9,529,388 B1
(45) Date of Patent: Dec. 27, 2016

(54) COMPUTER CASE ASSEMBLY MOUNTING SYSTEM

(71) Applicant: Hamid Mchatet, Miami, FL (US)

(72) Inventor: Hamid Mchatet, Miami, FL (US)

( * ) Notice: Subject to any disclaimer, the term of this patent is extended or adjusted under 35 U.S.C. 154(b) by 0 days.

(21) Appl. No.: 14/995,530

(22) Filed: Jan. 14, 2016

(51) Int. Cl.
*G06F 1/16* (2006.01)

(52) U.S. Cl.
CPC .................................. *G06F 1/1633* (2013.01)

(58) Field of Classification Search
CPC .... G06F 1/1616; G06F 1/1626; G06F 1/1628; G06F 1/1632; G06F 1/1633
See application file for complete search history.

(56) References Cited

U.S. PATENT DOCUMENTS

| | | | | |
|---|---|---|---|---|
| 4,066,231 A * | 1/1978 | Bahner | ................... | B43M 99/00 248/289.11 |
| 7,435,921 B2 * | 10/2008 | Rae | ...................... | H01H 9/0242 200/333 |
| 8,602,376 B2 * | 12/2013 | Vogel | ..................... | F16M 11/14 248/187.1 |
| 8,870,146 B2 * | 10/2014 | Vogel | ..................... | F16M 11/14 248/187.1 |
| D719,959 S * | 12/2014 | Vogel | ........................... | D14/447 |
| 9,025,317 B2 * | 5/2015 | Richardson | ......... | H04M 1/0252 361/679.01 |
| 2007/0099469 A1 * | 5/2007 | Sorensen | .................. | A45F 5/02 439/289 |
| 2009/0084705 A1 * | 4/2009 | Justiss | ...................... | A45F 5/02 206/724 |
| 2009/0196597 A1 * | 8/2009 | Messinger | ............ | F16M 11/14 396/427 |
| 2011/0064401 A1 * | 3/2011 | Desorbo | ............... | G03B 17/00 396/419 |
| 2011/0228458 A1 * | 9/2011 | Richardson | ......... | H04M 1/0252 361/679.01 |
| 2013/0078855 A1 * | 3/2013 | Hornick | ................ | H01R 13/73 439/571 |
| 2013/0181584 A1 * | 7/2013 | Whitten | ............... | G06F 1/1656 312/223.1 |
| 2016/0106190 A1 * | 4/2016 | Song | ..................... | A45C 11/00 361/679.3 |
| 2016/0138754 A1 * | 5/2016 | Li | ....................... | F16M 13/022 248/206.5 |
| 2016/0259374 A1 * | 9/2016 | Breiwa | .................. | H02J 50/10 |

* cited by examiner

*Primary Examiner* — Anthony Q Edwards

(74) *Attorney, Agent, or Firm* — Albert Bordas, P.A.

(57) ABSTRACT

A computer case assembly mounting system, having a case assembly with at least one hole. An insert is fitted within the case assembly. A magnet is mounted upon the at least one hole, and a computer is fitted within the insert. The computer as an example can be a smartphone or tablet.

17 Claims, 4 Drawing Sheets

COMPUTER CASE ASSEMBLY MOUNTING SYSTEM

BACKGROUND OF THE INVENTION

1. Field of the Invention

The present invention relates to computer case accessories and more particularly, to computer case mounting systems.

2. Description of the Related Art

Applicant is not aware of any prior art suggesting the novel features of the present invention.

SUMMARY OF THE INVENTION

The instant invention is a computer case assembly mounting system, comprising a case assembly having at least one hole. An insert is fitted within the case assembly. A magnet is mounted upon the at least one hole, and a computer is fitted within the insert. The computer as an example can be a smartphone or tablet.

The case assembly comprises an interior face, a top wall, a bottom wall, and first and second lateral walls. The at least one hole is defined by an inner edge. Extending from the inner edge is a sidewall that extends to an outer edge. The case assembly comprises an exterior face.

The insert comprises an insert interior face, an insert top wall, an insert bottom wall, and insert first and second lateral walls, and an exterior face. The insert is flexible.

In a preferred embodiment, the magnet is circular in shape and partially concave in shape. The magnet comprises a perimeter edge. Extending from the perimeter edge is an angled wall. The angled wall extends to a top edge. An interior angled wall extends from the top edge. The interior angled wall extends to an interior base edge, and the interior base edge terminates at an interior diameter edge. The magnet further comprises an interior wall. The present invention further comprises a mounting device comprising a magnetic material. In a preferred embodiment, the magnetic material is at least partially spherical in shape, whereby the interior angled wall and the interior base edge receives the magnetic material.

It is therefore one of the main objects of the present invention to provide a computer case assembly mounting system.

It is another object of this invention to provide a computer case assembly mounting system that may be secured onto a mounting device.

It is another object of this invention to provide a computer case assembly mounting system that swivels upon a mounting device.

It is another object of this invention to provide a computer case assembly mounting system that is volumetrically efficient for carrying, transporting, and storage.

It is another object of this invention to provide a computer case assembly mounting system that can be readily assembled and disassembled without the need of any special tools.

It is another object of this invention to provide a computer case assembly mounting system, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
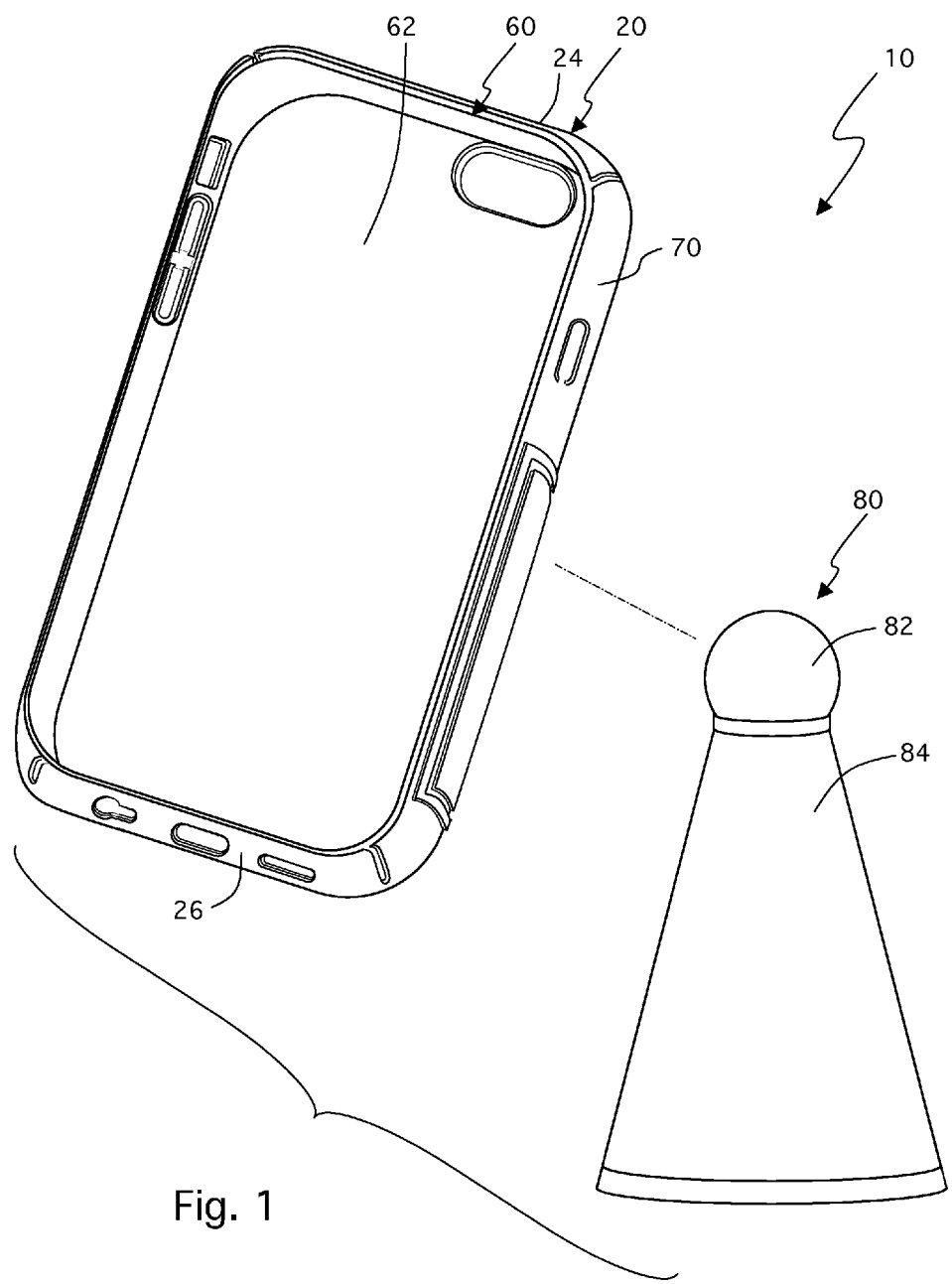
FIG. 1 represents an isometric view of the present invention.

Referring now to the drawings, the present invention is a computer case assembly mounting system and is generally referred to with numeral 10. It can be observed that it basically includes case assembly 20, magnet 40, insert 60, and mounting device 80.

As seen in FIG. 1, insert 60 is fitted within case assembly 20 that mounts onto mounting device 80.

Figure 2:
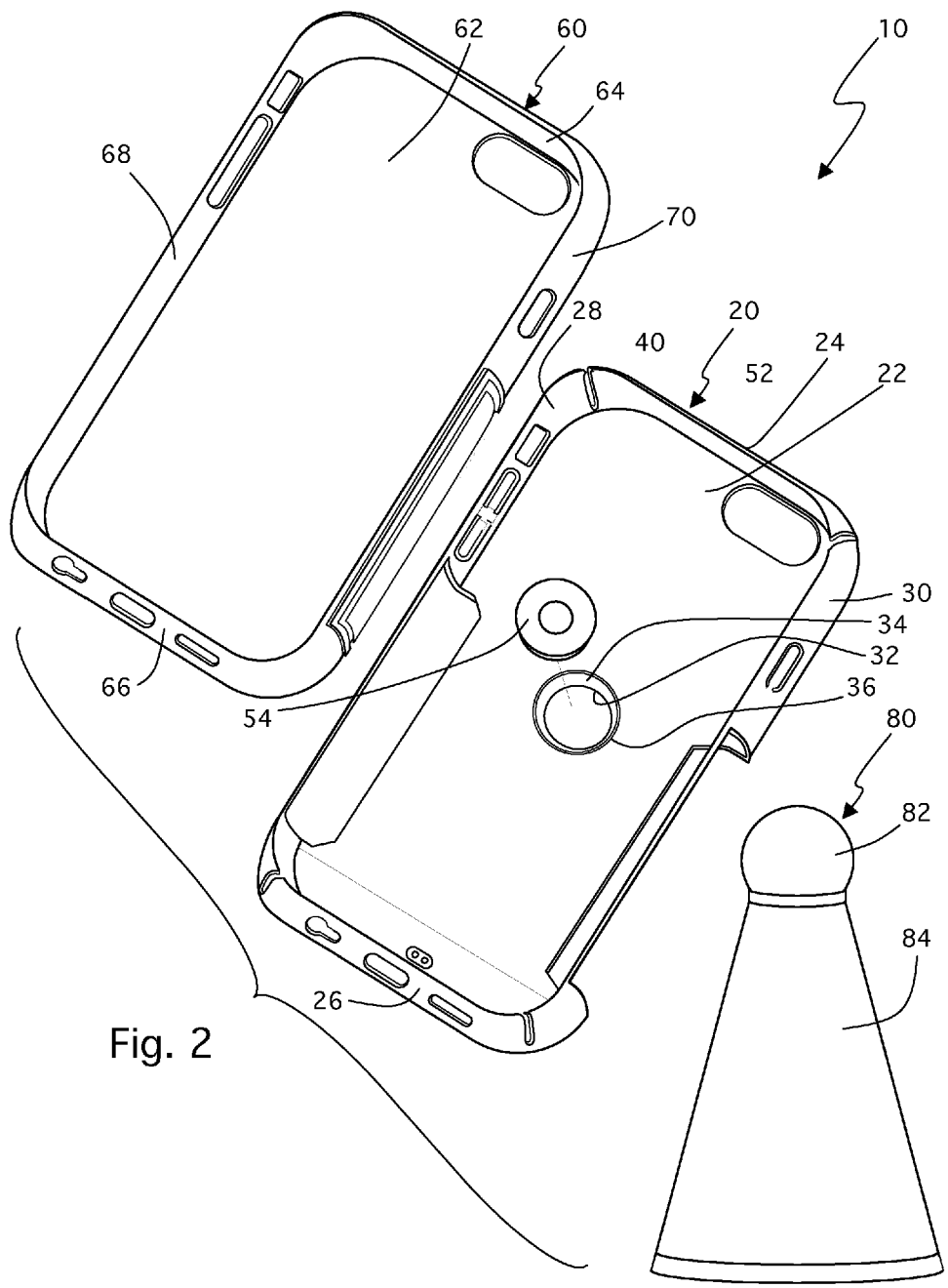
FIG. 2 is an interior side exploded view of the present invention.
Figure 3:
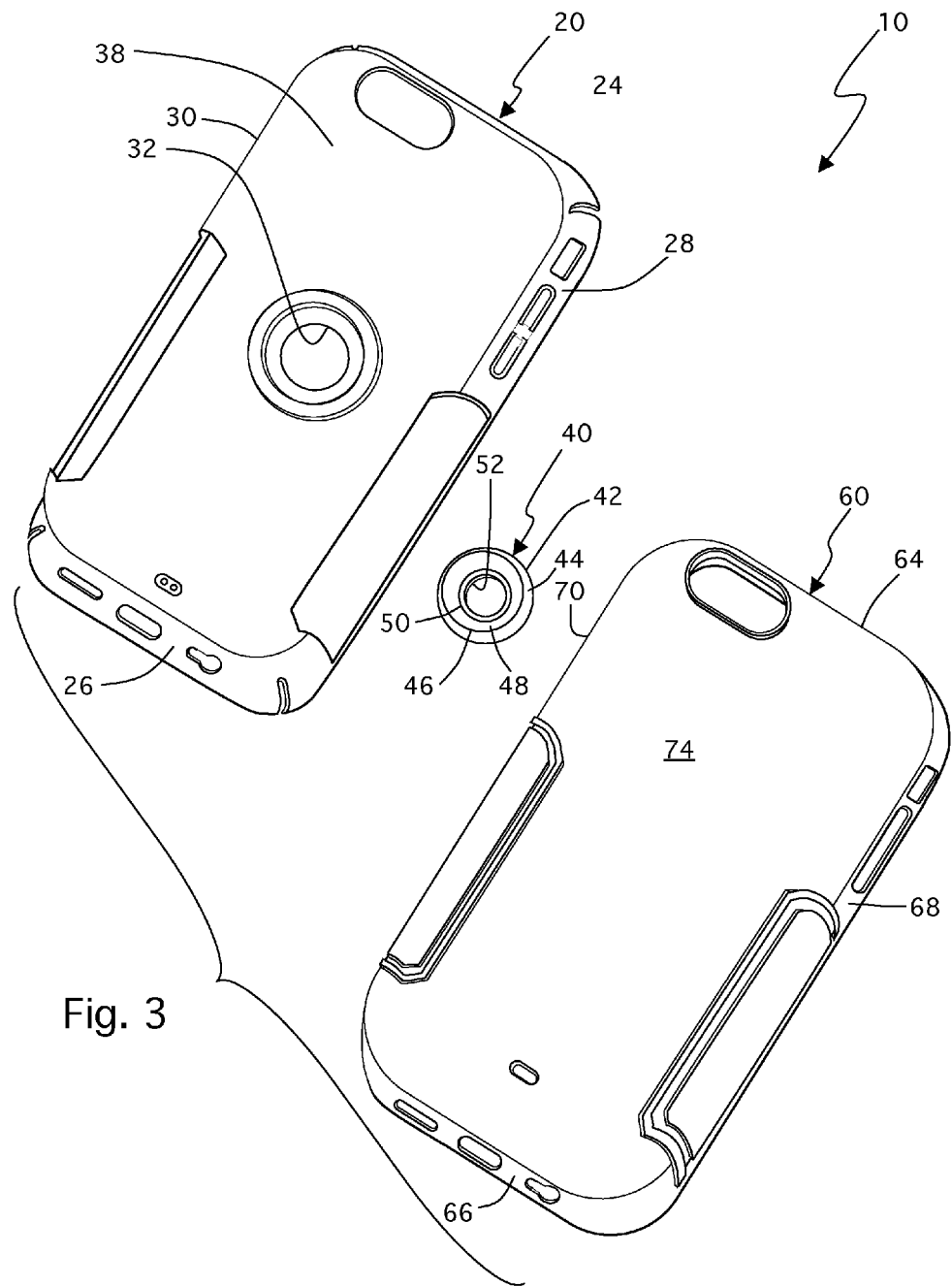
FIG. 3 is an exterior side exploded view of the present invention.

As seen in FIGS. 2 and 3, case assembly 20 comprises interior face 22, top wall 24, bottom wall 26, and first and second lateral walls 28 and 30. Case assembly 20 further comprises at least one hole defined by inner edge 32. Extending from inner edge 32 is sidewall 34 that extends to outer edge 36. Case assembly 20 also comprises exterior face 38.

Insert 60 comprises insert interior face 62, insert top wall 64, insert bottom wall 66, and insert first and second lateral walls 68 and 70. Insert 60 also comprises exterior face 74 and is of a cooperate shape and dimension to snugly fit within case assembly 20, whereby insert 60 is flexible.

In a preferred embodiment, magnet 40 is circular and one side is partially concave in shape. Magnet 40 comprises perimeter edge 42. Extending from perimeter edge 42 is angled wall 44 that extends to top edge 46. Interior angled wall 48 extends from top edge 46. Interior angled wall 48 extends to interior base edge 50 that terminates at interior diameter edge 52. Magnet 40 also comprises interior wall 54. Magnet 40 mounts upon the at least one hole defined by inner edge 32. More specifically, magnet 40 mounts upon sidewall 34 that extends to outer edge 36, whereby angled wall 44 is biased against sidewall 34.

Mounting device 80 comprises magnetic material 82 and base 84. Magnetic material 82 is at least partially spherical in shape. Magnetic material 82 as an example includes, but is not limited to, iron, nickel, cobalt, and steel. When mounting case assembly 20 upon mounting device 80, interior angled wall 48 and interior base edge 50 receive magnetic material 82 by magnetic attraction.

Figure 4:
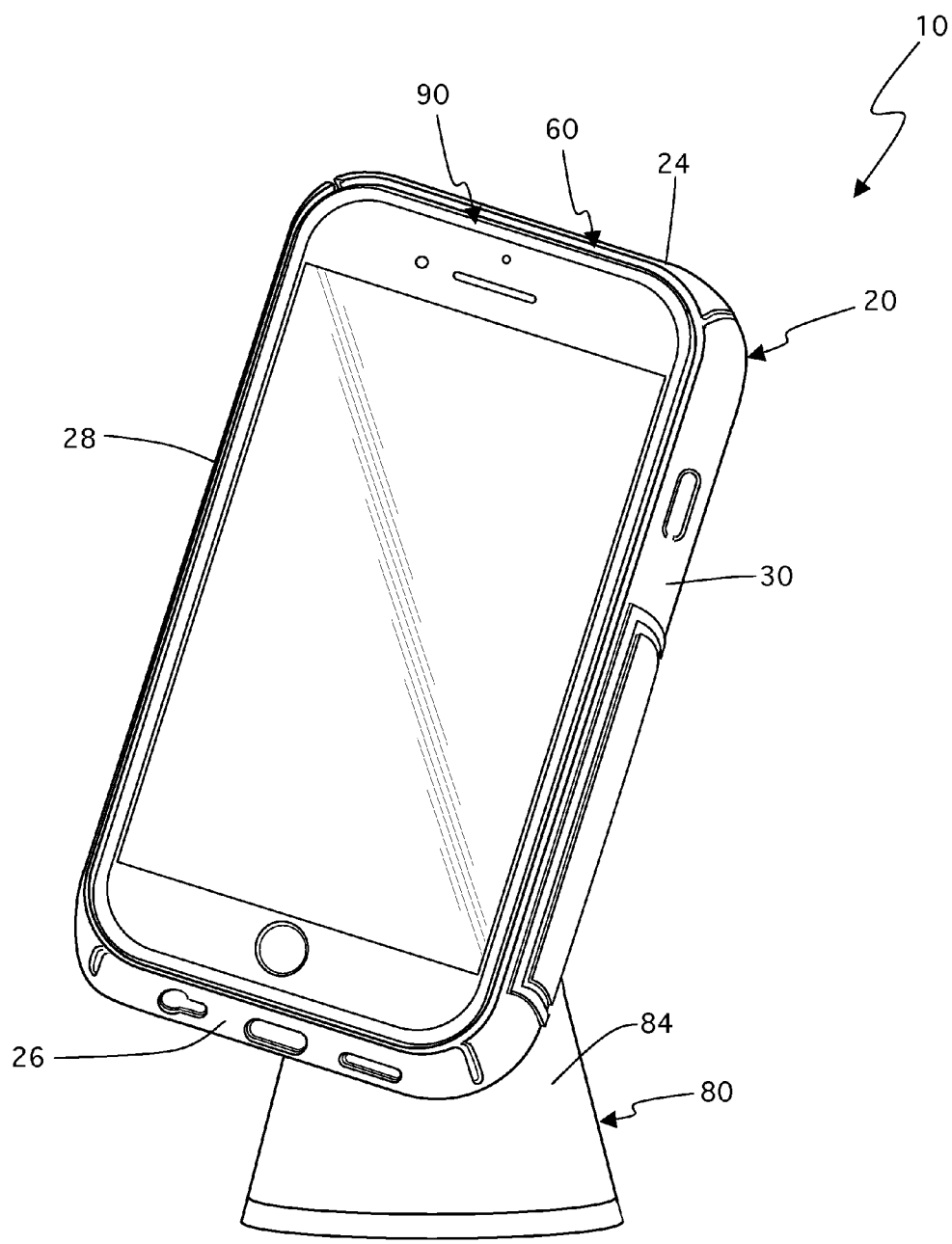
FIG. 4 is an isometric view of a computer mounted within the present invention.

As seen in FIG. 4, computer 90 snugly fits within insert 60. Computer 90 can be a smartphone or tablet as an example. Once mounted, case assembly 20 swivels and/or pivots upon mounting device 80 by the partially spherical shape of magnetic material 82.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A computer case assembly mounting system, comprising:
   A) a case assembly comprising at least one hole;
   B) an insert that is fitted within said case assembly;
   C) a magnet that is mounted upon said at least one hole, said magnet comprises a perimeter edge, extending from said perimeter edge is an angled wall; and
   D) a computer fitted within said insert, further characterized in that said insert comprises an insert interior face, an insert top wall, an insert bottom wall, and insert first and second lateral walls.

2. The computer case assembly mounting system set forth in claim 1, further characterized in that said case assembly comprises an interior face, a top wall, a bottom wall, and first and second lateral walls.

3. The computer case assembly mounting system set forth in claim 1, further characterized in that said at least one hole is defined by an inner edge, extending from said inner edge is a sidewall that extends to an outer edge.

4. The computer case assembly mounting system set forth in claim 1, further characterized in that said case assembly comprises an exterior face.

5. The computer case assembly mounting system set forth in claim 1, further characterized in that said insert comprises an exterior face.

6. The computer case assembly mounting system set forth in claim 1, further characterized in that said magnet is circular in shape.

7. The computer case assembly mounting system set forth in claim 1, further characterized in that said angled wall extends to a top edge.

8. The computer case assembly mounting system set forth in claim 7, further characterized in that an interior angled wall extends from said top edge.

9. The computer case assembly mounting system set forth in claim 8, further characterized in that said interior angled wall extends to an interior base edge.

10. The computer case assembly mounting system set forth in claim 9, further characterized in that said interior base edge terminates at an interior diameter edge.

11. The computer case assembly mounting system set forth in claim 9, further comprising a mounting device comprising a magnetic material.

12. The computer case assembly mounting system set forth in claim 11, further characterized in that said magnetic material is at least partially spherical in shape.

13. The computer case assembly mounting system set forth in claim 11, further characterized in that said interior angled wall and said interior base edge receives said magnetic material.

14. The computer case assembly mounting system set forth in claim 1, further characterized in that said magnet comprises an interior wall.

15. The computer case assembly mounting system set forth in claim 1, further characterized in that said insert is flexible.

16. The computer case assembly mounting system set forth in claim 1, further characterized in that said computer is a smartphone or tablet.

17. The computer case assembly mounting system set forth in claim 1, further characterized in that said magnet is partially concave in shape.

\* \* \* \* \*